United States Patent Office 3,527,568
Patented Sept. 8, 1970

3,527,568
PROCESS FOR THE PREPARATION OF LACTAMS
Otto Immel and Hermann Schnell, Krefeld-Uerdingen, and Hans Helmut Schwarz and Manfred Mansmann, Krefeld, Germany, assignors to Farbenfabriken Bayer Aktiengesellschaft, Leverkusen, Germany, a corporation of Germany
No Drawing. Filed Dec. 11, 1967, Ser. No. 689,325
Claims priority, application Germany, Dec. 16, 1966,
F 50,974
Int. Cl. C07d 41/06
U.S. Cl. 260—239.3
11 Claims

ABSTRACT OF THE DISCLOSURE

The invention relates to a process for the production of lactams by catalytic rearrangement of cycloketoximes in the gaseous phase using as a catalyst a composition consisting of a mixture of boron trioxide or boric acid with a sulfate, a sulfite or a phosphate of an element of the second main group of the Periodic Table. The lactams are obtained in higher yields than with known processes.

---

The invention relates to a process for the production of lactams by catalytic rearrangement of ketoximes in the gaseous phase.

It is known that cyclic ketoximines, especially cyclohexanone oxime, can be rearranged into the corresponding lactams by the action of acid reagents such as oleum, concentrated sulphuric acid or acetic anhydride.

It is also known that the rearrangement of cyclic ketoximes can be carried out at elevated temperatures of 200 to 400° C. in the gaseous phase in the presence of solid catalysts. In this process, strongly acid catalysts are used, such as various phosphoric acid, heteropolyacids, alkali metal bisulphates or boric acid, in most cases applied to carriers. It has been proposed to use aluminium oxide, silicic acid gel, diatomaceous earth, active charcoal, titanium dioxide and tin dioxide as carrier materials. The oxime vapours are passed over these catalysts at elevated temperatures and normal or subatmospheric pressure, with or without a carrier gas.

The highest lactam yields have hitherto been obtained in the catalytic rearrangement of cyclohexanone oxime in the presence of boric acid on titanium dioxide or tin dioxide as carrier material. Obtaining tin dioxide and titanium dioxide in a form suitable for the preparation of catalysts, however, requires considerable technical expenditure.

A process for the production of lactams by catalytic rearrangement of cycloketoximes in the gaseous phase in the presence of solid catalysts has now been found, which comprises contacting a cycloketoxime in the gaseous phase with a catalytic composition consisting of a mixture of boron trioxide or boric acid with a sulfate, a sulfite or a phosphate of an element of the second main group of the Periodic Table, or with mixtures of said sulfates, sulfites and phosphates. The sulfates, sulfites, primary, secondary and tertiary phosphates as well as the meta- and pyrophosphates of the second main group of the Periodic Table may be combined with boric acid or $B_2O_3$, either singly or in admixture. By this process, the lactams are obtained in higher yields than have been achieved with any of the known catalytic processes.

Another advantage of the process according to the invention is the very simple method of preparing the catalysts. The usual commercial alkaline earth metal phosphates or sulfates, such as calcium sulfate, calcium phosphate or barium sulfate, as well as the naturally occurring compounds such as gypsum, heavy spar, kieserite, celestite, apatite or phosphorite may be used. These can be mixed with boric acid or boron trioxide and made up into a paste with a small amount of water, for example in a kneading apparatus. The resulting composition is dried at about 100° C. and annealed at 400 to 800° C., preferably 450 to 500° C. Especially good results are obtained in the oxime rearrangement if the catalyst contains 15 to 60% of boron trioxide ($B_2O_3$). The catalyst may however contain 10 to 80% boron trioxide ($B_2O_3$).

Oxime rearrangement is advantageously carried out at a pressure of 0.1 to 1000 torr and preferably at temperatures between 220 and 380° C. It is advantageous to use oxime which contains water or to conduct steam over the catalyst during the oxime rearrangement. According to the invention, vapourised oxime, if desired mixed with other gases such as hydrogen, methane, nitrogen and steam, is contacted with the catalyst under the conditions mentioned. The oxime may also, however, be contacted with the catalyst in solid or liquid form. In that case, the catalyst may be arranged as a fixed bed or as a fluidised bed.

The residence time of the oxime in contact with the catalyst should amount to 0.1 to 10 seconds. When the activity of the catalyst falls, the catalyst can be regenerated by heating it in oxidising gases. This is generally only necessary after one part by weight of catalyst has served for the rearrangement of 5 to 20 parts of oxime.

The process according to the invention is suitable for rearranging cycloalkanoneoximes which have 5 to 12 carbon atoms in the ring to the corresponding lactams. For example, cyclopentanone oxime, cyclohexanone oxime, methyl cyclohexanone oxime and cyclododecanone oxime may be used.

The following examples are to further illustrate the invention without limiting it.

EXAMPLE 1

70 parts by weight of $CaHPO_4$ were thoroughly mixed with 120 parts by weight of boric acid and made up into a paste with a small amount of water in a kneading apparatus. The resulting mass was dried at 110° C. and then annealed for 3 hours at 700 to 800° C. This product was broken up in a mortar and reduced to a particle size of 0.1 to 1 mm. and employed as catalyst for the oxime rearrangement. 28.5 parts by weight of cyclohexanone oxime and 1.2 parts by weight of water were conducted at 340° C. and at a pressure of 40 mm. Hg over 20 parts by weight of this catalyst for 2 hours. At a conversion of 99%, the caprolactam yield was 98%, based on the reacted cyclohexanone oxime.

EXAMPLE 2

100 parts by weight of barium sulfate were mixed with 44 parts by weight of boric acid, made up to a paste with a small amount of water, dried at 110° C. and finally annealed at 450° C. for 3 hours. 92 parts by weight of cyclohexanone oxime and 3.6 parts by weight of water were pased over 20 parts by weight of the resulting catalyst of particle size 0.6 to 1 mm. at 340° C. and a pressure of 40 mm. Hg in the course of 6 hours. 57% conversion and a lactam yield of 95%, based on the reacted oxime, were obtained.

EXAMPLE 3

100 parts by weight of calcium sulfate ($CaSO_4 \cdot 2H_2O$) were mixed with 50 parts by weight of boric acid, made up to a paste with water in a kneading apparatus, then dried and annealed for 3 hours at 450° C. The resulting product was broken down to a particle size of 0.1 to 1 mm. and employed as catalyst for the rearrangement of oxime at 340° C. and 40 mm. Hg. A mixture of 3.9 parts by weight of water and 93 parts by weight of cyclohexanoneoxime was passed through 20 parts by weight of this catalyst during 6 hours. The resulting reaction product corresponded to a conversion of 96% and a lactam yield of 94.3%, based on the oxime that has undergone reaction. The used catalyst was then heated in a nitrogen-air mixture at about 480° C. 92.6 parts by weight of cyclohexanone oxime and 3.9 parts by weight of water were then passed through this regenerater catalyst for another 6 hours at 340° C. and 40 mm. Hg. The conversion rate in this case was 87% and the lactam yield 96%, based on the amount of reacted oxime.

EXAMPLE 4

70 parts by weight of calcium sulfate (calcined, $$CaSO_4 \cdot \tfrac{1}{2}H_2O)$$

were mixed with 30 parts by weight of boric acid and made up to a paste with a little water in a kneading apparatus. The resulting mass was dried and annealed at 480 to 530° C. for 2 hours. 29 parts by weight of cyclohexanone oxime and 1.2 parts by weight of water were conducted at 340° C. at a pressure of 40 mm. Hg over 20 parts by weight of the resulting catalyst of particle size 0.1 to 1 mm. in the course of 2 hours. The condensed reaction product contained 98% of caprolactam and no oxime.

EXAMPLE 5

42 parts by weight of $Mg_3(PO_4)_2 \cdot 7H_2O$ were thoroughly mixed with 72 parts by weight of boric acid and made up to a paste with a small amount of water in a kneading apparatus. The resulting mass was dried at 110° C. and annealed at 480 to 500° C. for 3 hours and then reduced to a particle size of 0.2 to 1 mm. 28.7 parts by weight of cyclohexanone oxime and 1.2 parts by weight of water were conducted over 20 parts by weight of the resulting catalyst at 340° C. and a pressure of 40 mm. Hg in the course of 2 hours. The conversion rate in this case was 97.3% and the lactam yield 96.6% based on the amount of reacted cyclohexanone oxime.

EXAMPLE 6

70 parts by weight of barium sulfite ($BaSO_3$) were mixed with 40 parts by weight of boric acid and made up into a paste with some water in a kneading apparatus and then dried at 110° C. and annealed at 480 to 530° C. for 3 hours. 102.2 parts by weight of cyclohexanone oxime and 4.3 parts by weight of water were conducted over 20 parts by weight of the resulting catalyst of particle size 0.2 to 1 mm. at 340° C. and a pressure of 40 mm. Hg in the course of 6 hours. The condensed reaction product corresponded to a 79% conversion and a caprolactam yield of 97.5% based on the amount of reacted cyclohexanone oxime.

EXAMPLE 7

40 parts by weight of $CaSO_4 \cdot \tfrac{1}{2}H_2O$, 40 parts by weight of $CaHPO_4$ and 35 parts by weight of boric acid were thoroughly mixed. The mixture was pasted with a little water in a kneading apparatus. The resulting mass was dried at 110° C., annealed at 450 to 500° C. for 2 hours and then reduced to a particle size of 0.2 to 1 mm. 33.1 parts by weight of cyclohexanone oxime containing 4% by weight of water were passed over 20 parts by weight of the resulting catalyst within 2 hours at 340° C. and 40 mm. Hg. The condensed reaction product corresponded to an oxime conversion of 99.6% and a caprolactam yield of 97.4%, based on the amount of reacted cyclohexanone oxime.

What we claim is:

1. A process for the production of lactams by catalytic rearrangement of cycloketoximes in the gaseous phase in the presence of solid catalysts comprising heating at a temperature of 220° to 380° a cycloketoxime in the gaseous phase with a catalytic composition consisting of a mixture of boron trioxide or boric acid with a sulfate, a sulfite, or a phosphate of an element of the second main group of the Periodic Table or with mixtures of said sulfates, sulfites, and phosphates.

2. The process of claim 1, said contacting being carried out in the presence of water vapour.

3. The process of claim 1, said contacting being carried out at a pressure of 0.1 to 1000 torr.

4. The process of claim 1, said composition containing 15 to 60% by weight of boron trioxide.

5. The process of claim 1, said phosphate being calcium phosphate.

6. The process of claim 1, said sulfate being barium sulfate.

7. The process of claim 1, said sulfate being calcium sulfate.

8. The process of claim 1, said phosphate being magnesium phosphate.

9. The process of claim 1, said sulfite being barium sulfite.

10. The process of claim 1, said mixture consisting of calcium sulfate and calcium phosphate.

11. The process of claim 1, said cycloketoxime being cyclohexanoneoxime.

References Cited

UNITED STATES PATENTS

| 3,153,037 | 10/1964 | Tomic | 260—239.3 |
| 3,154,539 | 10/1964 | Irnich | 260—239.3 |
| 3,210,338 | 10/1965 | Huber | 260—239.3 |

FOREIGN PATENTS

| 881,276 | 11/1961 | Great Britain. |

HENRY R. JILES, Primary Examiner

R. T. BOND, Assistant Examiner

U.S. Cl. X.R.

260—294.7